A. C. SALTER.
SPRING VEHICLE TIRE.
APPLICATION FILED MAY 1, 1916.
1,202,898.                                              Patented Oct. 31, 1916.
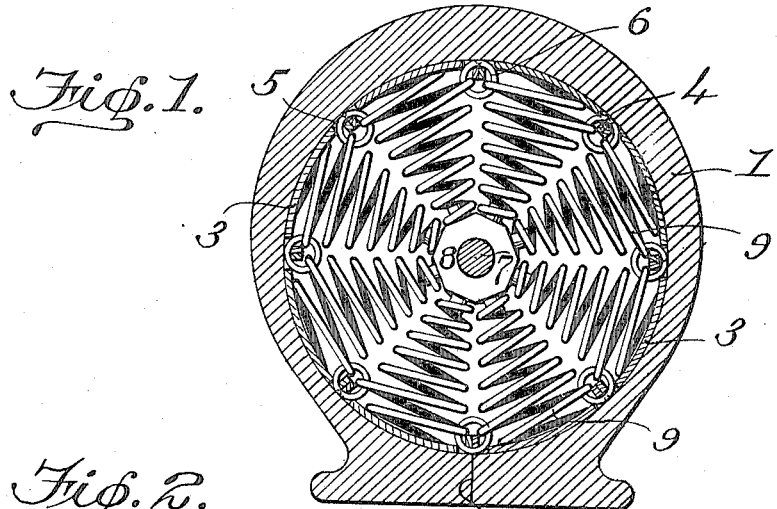
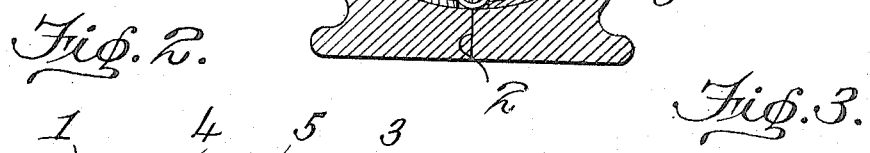
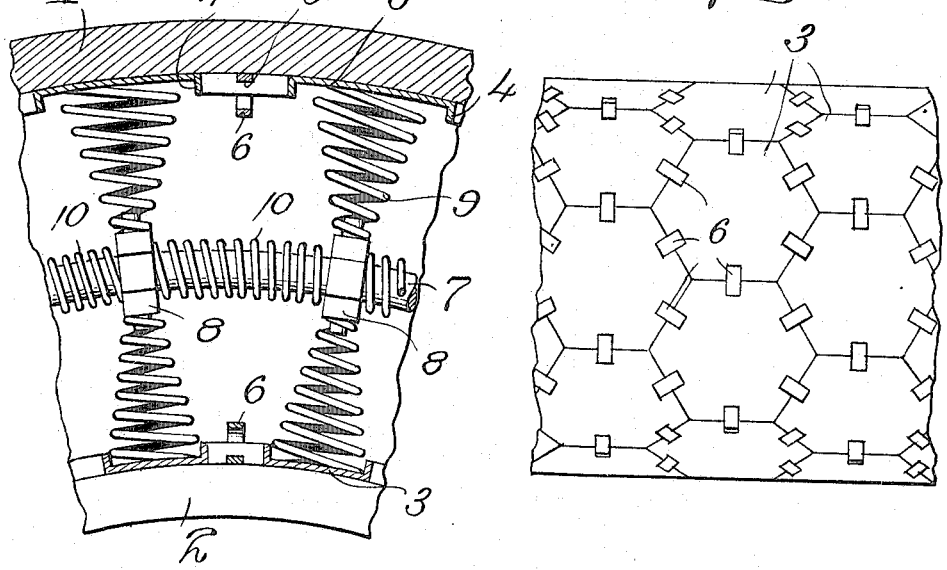
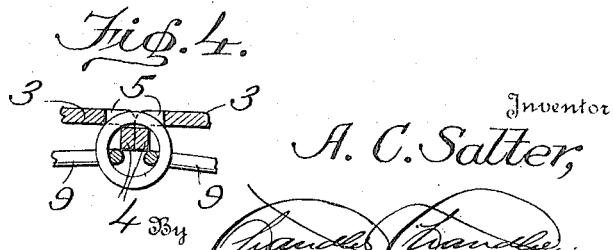
Inventor
A. C. Salter,

UNITED STATES PATENT OFFICE.

ALBERTUS C. SALTER, OF BARTOW, GEORGIA.

SPRING VEHICLE-TIRE.

1,202,898.

Specification of Letters Patent.  Patented Oct. 31, 1916.

Application filed May 1, 1916.  Serial No. 94,761.

*To all whom it may concern:*

Be it known that I, ALBERTUS C. SALTER, a citizen of the United States, residing at Bartow, in the county of Jefferson, State of Georgia, have invented certain new and useful Improvements in Spring Vehicle-Tires; and I do hereby declare the following to be a full, clear, and exact description of the invention, such as will enable others skilled in the art to which it appertains to make and use the same.

This invention relates to a spring vehicle tire.

An object of the invention resides in the provision of an improved tire structure by means of which all of the advantages of a pneumatic tire will be attained but none of the disadvantages, that is to say, one wherein the maximum amount of resiliency will be present and one wherein the possibility of the tire becoming inoperative or ineffective because of a puncture, will be obviated.

A further object of the invention resides in the provision of a device which is so constructed that the possibility of the parts becoming inoperative will be practically eliminated and so that the life of the device will be long.

A still further object of the invention resides in so constructing the tire that it may be readily applied to the rim of a vehicle wheel.

With these and other objects in view, such as will appear as my description progresses, my invention comprises the combination and arrangement of parts as set forth in and falling within the scope of the appended claims.

In the drawing: Figure 1 is a transverse sectional view taken through a tire constructed in accordance with my invention; Fig. 2 is a fragmental sectional view taken in a plane at right angles to Fig. 1 and in the plane of the tire; Fig. 3 is an enlarged fragmental plan view of a portion of the inner casing, and Fig. 4 is a detail showing the manner in which the several plates of the inner casing are secured together and the manner in which the springs are secured to the plates.

The embodiment of the invention illustrated in the drawing includes a shoe 1 which is made of suitable material and the edges of which are brought together, at 2. A tubular casing is mounted within this shoe 1 and extends completely around the same. This casing is composed of a plurality of hexagonal plates 3 each of which is provided with inwardly turned flanges 4 arranged at its edges. The flanges 4 of the plates are arranged in abutting relation and each of the plates is provided, at each of its edges, with a slot 5 which extends partially through the main portion of the plate and partially through the adjacent flange as clearly illustrated in the drawing. In order that these plates 3 may be secured togegther, loosely, I have provided a plurality of rings 6 which extend through the slots 5 and which are so arranged in the slots that they will not project beyond the outer faces of the plates 3. The result of this is, the provision of a tubular casing which is composed of a plurality of plates which are loosely secured together, the outer face of which casing is entirely smooth and consequently will have no abrading action on the shoe 1 against which it bears.

In order that each individual plate 3 of the casing may be forced resiliently and independently against the inner face of the shoe 1, I have provided a circular rod 7 which is arranged within the casing and concentrically with the same. A plurality of polygonal collars 8 are slidably mounted upon this rod 7 and extending from each side of each of these collars is a spiral spring 9 which is connected to the corresponding plate 3 of the casing. These springs are connected to the plates by means of the rings 6, the rings engaging the outermost convolutions of the springs. These collars 8 are held in spaced relation to each other and consequently held in place upon the rod 7 by coil springs 10 which encircle the rod and bear against the faces of the collars. With this arrangement of the springs it will be seen that each of the plates will be forced against the inner face of the shoe independently and resiliently so that the casing will, in fact, be flexible and the local pressure on the shoe efficiently taken up.

From the foregoing description it will be seen that I have provided a tire which includes a shoe, an inner metallic casing which is composed of a plurality of plates hinged together and resilient means for forcing each of the plates into engagement with the shoe. I have so constructed the plates and have so secured them together that the outer face of the casing which bears against the inner face of the shoe, will be smooth and consequently there will be no abrading of the shoe. Furthermore I have provided novel means for securing the plates together and the springs to the plates.

While I have illustrated and described a particular embodiment of my invention, it has merely been for the sake of convenience and I do not wish to be limited to that particular embodiment as it is obvious that numerous changes may be made in the details of construction without departing from the spirit of the invention or exceeding the scope of the appended claims.

What I claim is:—

1. In a spring tire, the combination with a shoe, of a tubular casing mounted therein, said casing comprising a plurality of plates hinged together, a circular rod mounted within the casing concentrically with the same, collars slidably mounted on the rod, means for holding the collars in predetermined positions and springs attached to the collars and to the plates.

2. In a spring tire, the combination with a shoe, of a tubular casing arranged therein, said casing including a plurality of polygonal plates having flanges at their edges, the flanges of the plates being arranged in abutting relation, the said plates having also registering slots cut partially in the plates proper and partially in the flanges, rings extending through the slots and securing the plates together, loosely, and resilient means for forcing each of said plates against the inner face of the shoe.

3. In a spring tire, the combination with a shoe, of a tubular casing mounted therein, said casing comprising a plurality of plates loosely hinged together, a circular rod mounted within the casing concentrically therewith, a plurality of collars slidably mounted on the rod, springs secured to said collars and attached to the said plates, and springs encircling the rod and disposed between the collars for maintaining the same in predetermined positions.

In testimony whereof, I affix my signature, in the presence of two witnesses.

ALBERTUS C. SALTER.

Witnesses:
GEO. H. CHANDLEE,
A. ELLISON.

Copies of this patent may be obtained for five cents each, by addressing the "Commissioner of Patents, Washington, D. C."